Feb. 19, 1963 G. W. THOMAS ET AL 3,077,945
PRODUCTION OF ACOUSTIC TILE MATERIAL AND TILE THEREFROM
Filed Aug. 7, 1959 3 Sheets-Sheet 1
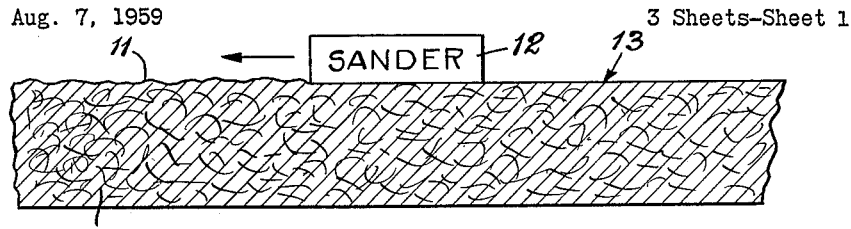
*Fig. 1*
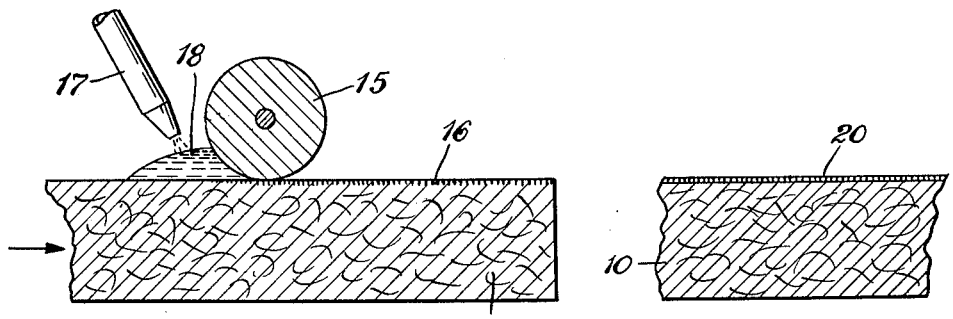
*Fig. 2*
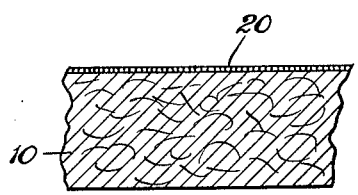
*Fig. 3*
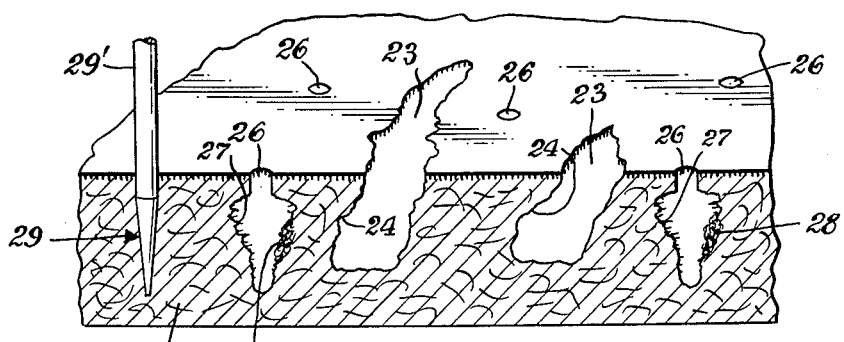
*Fig. 4*
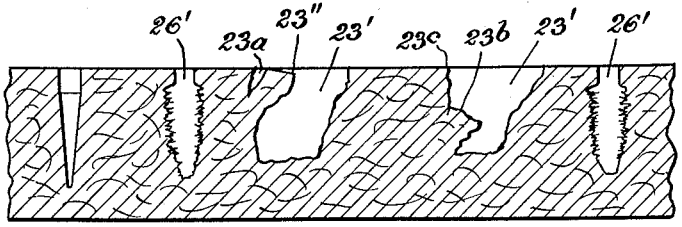
*Fig. 4ᵃ*
INVENTORS
George W. Thomas
Paul J. McGervey
by W. Bartlett Jones,
Attorney Feb. 19, 1963   G. W. THOMAS ET AL   3,077,945
PRODUCTION OF ACOUSTIC TILE MATERIAL AND TILE THEREFROM
Filed Aug. 7, 1959   3 Sheets-Sheet 2

INVENTORS
George W. Thomas
Paul J. McGervey
by W. Bartlett Jones,
Attorney

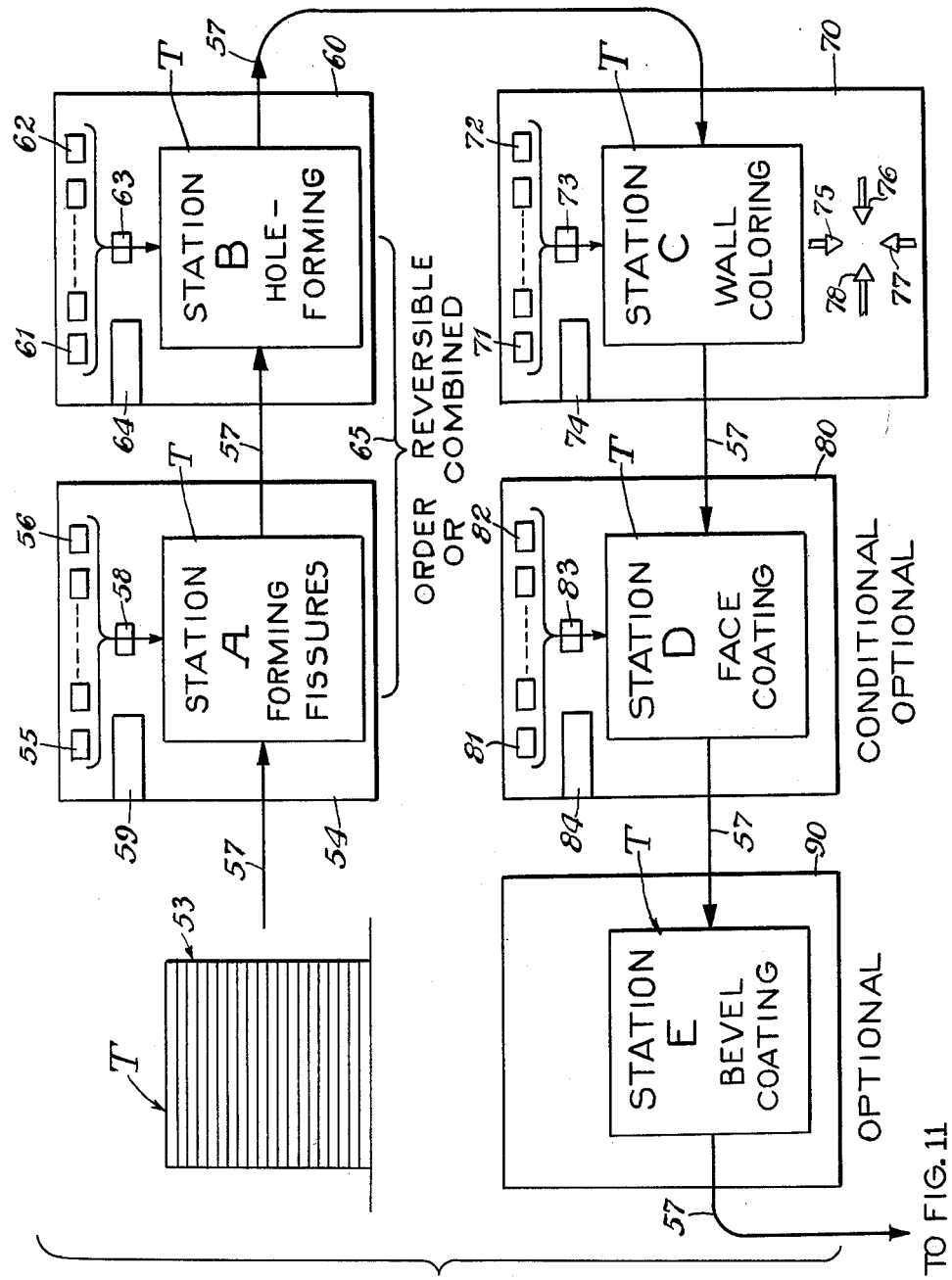

3,077,945
PRODUCTION OF ACOUSTIC TILE MATERIAL
AND TILE THEREFROM
George W. Thomas, Cloquet, and Paul J. McGervey, North Oaks, St. Paul, Minn., assignors to Wood Conversion Company, St. Paul, Minn., a corporation of Delaware
Filed Aug. 7, 1959, Ser. No. 832,231
5 Claims. (Cl. 181—33)

The present invention relates generally to the manufacture of decorative acoustic panel material, and in particular to the continuous production of units in the form of tile having visual variants of the same general visual appearance, so that an assembly thereof is not limited by repetitive use of one pattern, and so that all selected subassemblies thereof have a generally uniform character.

In the acoustic tile field the decorative effect of heterogeneously arranged fissures into the exposed face of the tile has become accepted and is in demand. The decorative effect is the visual contrast between the area of the fissures and the unfissured area of the face containing the fissures, said unfissured area generally being substantially a monochrome in its light-reflectance. To produce such monochrome for practical purposes, such as its permanence and its ability to be cleaned or painted, the monochrome of the unfissured area is achieved by providing a non-porous surface layer, preferably a solid film, commonly by applying a coating composition.

Because the desired decorative effect limits the area to be occupied by fissures, the fissures into a porous material of the tile do not provide adequate sound absorption for such fissured tile to qualify commercially as acoustic tile.

In describing the present invention the terms "fissure-like openings" and "fissures" are used synonomously, however they are produced, such terminology having been established in the industry with reference to acoustic tile.

The present invention may be carried out with consideration of appearance to the eye, as hereinafter explained in terms of light-reflectance. Since light-reflectance varies with the illuminating light the term is used in reference to daylight and normal artificial light as distinguished from specialized or accentuated colored lighting. Using daylight as the standard of reference, the term "white-light-reflectance" has been employed.

To impart adequate sound-absorbency to porous-bodied panel material having a fissured or unfissured porous or non-porous face which is inadequate for the purpose, holes have been punched or drilled into the panel by one or more conventional processes. The openings of such holes also exhibited a visual contrasting pattern between them and the containing face. To retain the decorative effect of fissures and to provide adequate sound-absorbency, the face and the walls of the fissures may be so formed as to exhibit the porosity of the panel body, thus to permit reduction in the number of holes. As a result, such a porous face cannot be redecorated as by painting over it. Increasing the number of holes increases the contrast of holes-and-face and for greater decorative value this contrast should not be so great as to subordinate and subdue the contrast of fissure-and-face.

These defects and disadvantages in porous-bodied panel material for such tile may be overcome by providing different white-light-reflectance for the panel face and at least a suitable portion of the walls of the fissures, so as to create a strong visual contrast between fissures-and-face which effectively subdues and subordinates the visual contrast of holes-and-face, where the number of holes is large for any reason, in particular because the face is non-porous.

It is one object of the invention to provide a process for producing tile in a line of production of non-repetitive units by varying the individual steps in the succession of steps to produce a tile.

It is a particular object of the invention to provide an acoustic tile of porous body material having decorative fissures in the face thereof, and having a multiplicity of openings for holes in the face which holes apart from the fissures and the inter-hole area of the face are adequate for imparting sound-absorbency to the tile.

It is a further object of the invention to provide a process that may be practiced on dry porous-bodied panel material of either fibrous or non-fibrous character, which is already coated or is to be coated.

Various other and ancillary objects and advantages of the invention will be apparent from the following description and explanation of the invention, referring to the accompanying drawings, in which:

FIG. 1 represents a fiber board with an initial rough face being rendered smooth.

FIG. 2 represents application of a fiber-embrittling composition for the surface fibers.

FIG. 3 illustrates a board with a hard surface layer.

FIG. 4 represents a vegetable fiber board having fissures and specialized punched cavities resulting from the character of the fiber.

FIG. 4ª represents a mineral fiber board with a different form of punched cavity resulting from the character of the fiber, and it also shows an optional deforming of a fissure.

Figure 5:
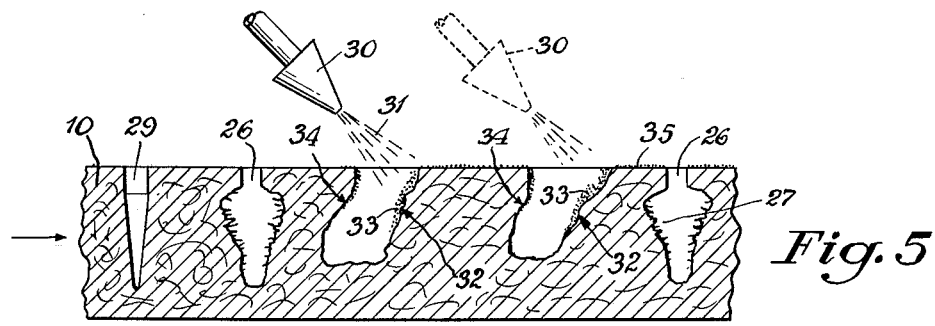

FIG. 5 illustrates coating walls of fissures.

Figure 6:
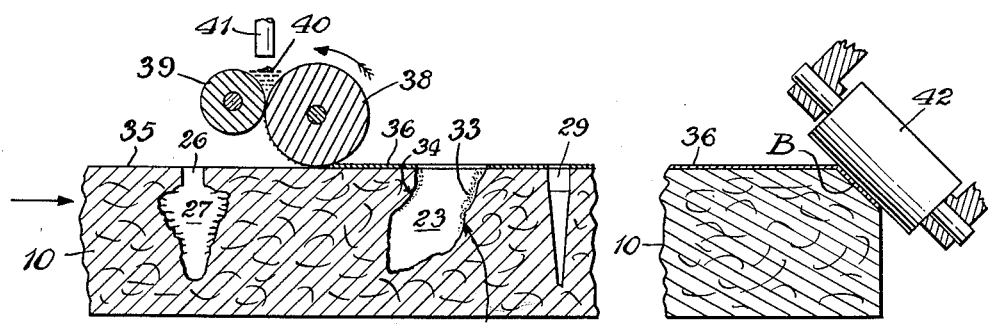
Figure 7:
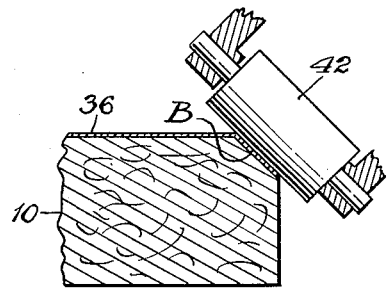

FIGS. 6 and 7 illustrate surface-coating operations for the face.

Figure 8:
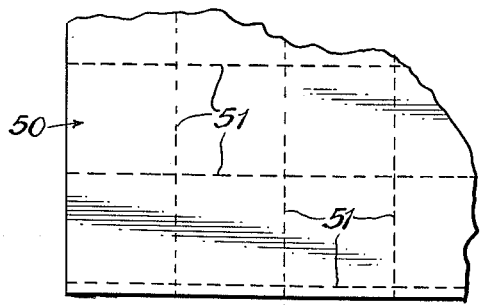

FIG. 8 represents a large panel to be cut to tile, as indicated by dotted lines.

Figure 9:
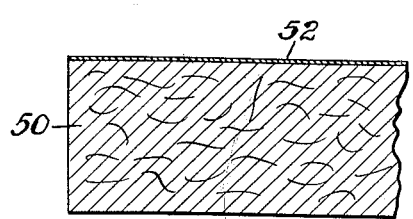

FIG. 9 is an enlarged fragmentary cross-section of the panel of FIG. 8 showing in particular an optional surface coat.

FIG. 10 represents diagrammatically a production line for successive steps in producing acoustic tile, to illustrate in particular a plurality of different selectable variations for a plurality of the steps.

Figure 11:
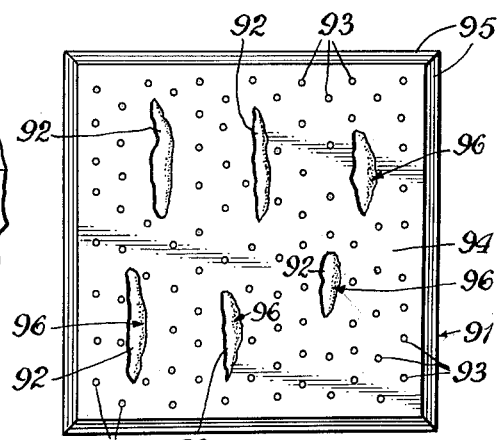

FIG. 11 represents a tile having a surface coat, fissures and acoustic holes.

In the Jones Patent No. 2,747,470, there is described a process for producing a fissured fibrous panel by piercing and screeding a mobile aqueous mass of the fibers in process on a Fourdrinier machine for dewatering a slurry to form a felt which when dried presents fissures. For so forming fissures the ingredients for the panel and the processing thereof to form the dry panel must be specially adapted for the screeding, and in consequence, the body material and structure of the panel or tile cut therefrom are limited by such processing.

By the present invention, the panel content and structure are not limited. It may be a porous mass of bonded mineral granules. It may be a bonded or unbonded felt of vegetable fibers, or of natural or manufactured mineral fibers. In the latter case, the conventional manufactured mineral fibers, such as mineral wool and glass fibers, are brittle to a degree requiring a bonding agent.

One way to form fissure-like openings in a dry porous fibrous panel is described in Proudfoot et al. No. 2,791,-289. A stencil with openings to define fissure boundaries in the plane face of a tile is placed on the face and the tile below is sand-blasted in one or more directions through the stencil openings to erode fissure-like openings, which may be undercut with reference to the stencil outline. Because of inadequate absorbency, resulting from a microscopically porous face of the tile described in said patent and from the increased porous area provided by the walls of the fissures, the face is additionally perforated with a few well dispersed small holes having macroscopic openings of size from 1/16 to 3/16 cross-section. The holes are sparse rather than multitudinous so that the visual contrast of holes-and-face is subdued to the eye and subordinated to the visual contrast of fissures-and-face.

Such a tile which depends in part upon its porous face for sound-absorbency is commercially deficient, in that after installation it may not be redecorated by paint or like covering, except with loss of sound-absorbency not only at the porous plane face, but also where such applied coating material may cover part or all of originally porous fissure walls, as commonly results from spray-painting.

According to the present invention, the internal porosity of the body of the panel and a multiplicity of macroscopic holes are depended upon for the sound-absorbency, and the fissure-like openings are provided primarily for decorative effect, regardless of whether or not they may in some cases have walls which in whole or in part add to the sound-absorbency. Thus, the plane face is permitted to be non-porous, as for example, by being coated with a solid-film-forming coating composition providing a substantially monochrome surface. But because the holes provide a visual contrast with the monochrome face containing them when it is of a conventional light-color or white, and because the fissures and said face also provide a second visual contrast, such second visual contrast is made the predominating one in order to subdue to the eye and subordinate to it the holes-and-face contrast.

The subordination of contrast is effected by predetermining the white-light-reflectance of the plane face by reference to the white-light-reflectance of the walls of the fissure-like-openings, or those parts of said walls which are involved in the fissure-and-face contrast. The said walls or parts thereof may be interior walls of the panel body presenting the body porosity and the light-reflectance thereof, in which case the face is coated with material to produce said predominant contrast. For numerous reasons, and in particular to have a desired or conventional light-colored white-light-reflecting face, for example white, the fissure walls in whole or in part are coated or colored to provide the predominant contrast, if the color of the interior of the panel does not provide a desirable contrast, the coloring treatment preferably beginning at an edge of the fissure.

Therefore, it is to be understood that in some cases the white-light-reflectance of the fissure walls or parts thereof is the base with respect to which the white-light-reflectance of the tile face is selected. In other cases, it is the white-light-reflectance of the coated or uncoated tile face with respect to which the white-light-reflectance for the fissure walls is selected.

It is not intended in the foregoing to imply that the entire wall of a fissure-like opening be uniform in its light-reflectance. It is largely the portion of the wall intersecting with the face that participates in the fissure-and-face contrast. That portion alone may be coated or colored, and not necessarily uniformly. Color, for example, may shade from one tone to another of the same color, or into a different color. By spraying color into a fissure at an angle, one wall may have one color, and by reversing the angle the opposite wall may receive a different color. Color so provided may be coating material, porous or not, or it may be staining liquid, such as a dye for cellulosic fibers.

In carrying out the invention, panel material in large pieces may be used. Since acoustic material is conventionally provided in the form of small units, called tile, at least part of the procedure is carried out on tile units. Tile units are usually squares with a decorative face. In an assembly such as a ceiling, all the tile may have the same pattern but adjacent tile may be differently oriented. However, it is preferred to assemble variants of a generally similar pattern produced by the present invention.

One feature of the present invention is the continuous production of tiles having variants of a generalized pattern. Variable elements of a generalized pattern include:

(1) Location, shape, size, depth and number of fissures.

(2) Light-reflectance of fissure walls, both uniform and non-uniform.

(3) Pattern of the multiplicity of holes, including variants of hole size and number.

(4) Light-reflectance of tile face.

Tiles cut from dry porous panel material may be fed in one or more progressing lines through operating stations for forming fissures, forming holes, coating or coloring fissure walls (either practiced or omitted), and coating the tile face, if needed. No particular sequence is essential, although some sequences have advantages over others.

As to forming fissures and holes, either step may be carried out first, or both simultaneously, and it is immaterial that the same area of the tile may include a hole and a fissure. A final fissure may be produced by forming a fissure, which may be one of a repetitive character, and then in a variety of ways altering it by variously altering its edges.

It is preferred that the face be coated after any coating of fissure walls, because this may be done readily by rolls without thereby coating the walls of the fissures, which may be the raw surface of the body or which may have been previously colored or coated. Where a step altering the color of the fissure wall spills over onto the face, the subsequent roll-coating of the face is advantageous in covering the spilled-over area.

Fissures may be formed in numerous ways. One way is by sandblasting through a stencil. This is a preferred way to produce an undercut fissue wall. A routing bit may be suitably guided to form a variety of shapes of fissures. Punches forced normally into the face of the panel to compress areas and leave fissures may be practiced, and especially where the fibers are brittle to be broken by a punch and then removed. Cutting dies may outline fissures and the material within removed with or without the die in place as a fence.

Because variation in appearance in highly desirable, fissures formed initially with the same contour or from use of the same die, template, fence or stencil, may be altered to produce a number of variations, by variously altering the edges. Edges may be chipped away; and especially where a wall is undercut, a portion of the body beyond said edge may be moved in whole or in part into the fissure, as described hereinafter.

For whatever method is employed for forming fissures, the desired variations may be effected at a fissure-forming station in a line of production, at which station means is provided to bring into operative relation to a tile a selected one of a supply of patterns or methods for the operation, coupled with provisions, which may be automatic or manual, for changing the selected one in any desired manner, thus effecting discharge from said station of a line of variously fissured tiles. When the fissures are punched by a die, each die may operate through a stripper plate, so manipulated as to hold the tile against following the die when withdrawing the die.

For each variant of the fissure-forming, there may be a station for altering the contours of fissures. For example, fissure X may have its edges modified by applying a selected one of a plurality of means, each such means producing one variant in the modification of the original fissure contour.

For forming holes there is also a station in the line which in some cases may be the fissure-forming station, and in others, a separate station. Holes may be drilled by a bank of drills in a well known manner in such a separate station. However, it is preferred to punch the holes by inserting pins suitable to the particular tile. Pin-punching is mechanically simpler than drilling, and permits forming holes of smaller size, which present less holes-and-face contrast than would the same pattern of drilled holes. The pattern arrangement as well as hole-size is involved. For varying the patterns the station is provided with means to bring into operative relation to a tile a selected one of a supply of patterns or methods for the drilling or punching operation. Where the holes are pin-punched the patterns may be formed on a series of platens fitted variously with a multiplicity of parallel pins and with cooperative pressing and stripping plates for said pins as later described herein. Since the pattern variation in the tile depends primarily on the patterns of fissures, a single pattern for holes may be used, especially when they are small and pin-punched.

For altering the appearance of fissure walls there may be provided another station in the line of tile travel, at which station there is means for applying, say an aqueous dye solution, or an aqueous dispersion of pigment and a binder such that a coating of the dispersion dries to a non-porous coat, or some other type of coating composition. The preferred method is to spray the material. This may be done so as to treat the entire wall area of the fissure, or any desired part or parts. For example, one side wall may be sprayed in a direction to avoid hitting the opposite wall. Then, if desired, the direction of spraying may be reversed to spray the opposite wall or part thereof, even with a different shade of the first material or a different color entirely. When the face is to be coated later, the treatment of fissure walls may spill over onto the face.

When the face is coated after the fissures are formed, or formed and wall-treated, there is a face-treating station through which the line of tiles passes. Although it is preferred for the general run of acoustic tile to have a uniform monochrome for the face, it is contemplated that at this station the treatment may be varied from unit to unit. For example, the applied material for succeeding tile units may be one selected from several available supplies, all leading to the desired contrast for the purposes of the invention. For example, this station may have several coating rolls each carrying a different material, and each to be selected to produce the variants in facial treatment.

It is also to be understood that the sequence may vary and the steps in number may vary. For example, a dry panel to be cut into tiles later to be operated upon may present the final surface character of the tile, such as a coat of paint, or lacquer, or mineral surfacing, as well known in the art. It may be a calendered face of an inwardly porous vegetable fiber panel. The panel, surface-treated or not, is cut to tile units, and if its tile edges are beveled, the bevel may be coated or calendered in any manner well known in the art. Then the holes and the fissures are formed in any sequence. In such a case, the white-light-reflectance of the face may be such that its contrast with the raw walls of the fissures is predominant over the holes-and-face contrast, thus permitting dispensing with alteration of the appearance of fissure walls. By providing a pre-colored face on a panel having a panel-body material of a suitable contrasting white-light-reflectance when exposed at a raw fissure wall need for treating the fissure walls in the tiles may be avoided.

The panel material may be made of fibrous or non-fibrous material with respect to both of which porous formulations are well known. Fibrous material is preferred for greater strength and toughness, and for fire-resistance mineral fibers are employed. Mineral fibers may be natural amosite, or manufactured mineral wool, or glass fibers, with or without other mineral additives such as bentonite, diatomaceous earth, and chrysotile asbestos. The mineral felts are preferably made by suspending the fibers in water with binder which is preferably starch grains, to swell and burst on drying the water-laid felt with heat.

Vegetable fiber felts are also preferably made by depositing the same from a water-slurry, as in the conventional manner of making fibrous insulation board.

Both mineral and vegetable fiber felts of density in the vicinity of 14 to 22 pounds per cu. ft., are suitably porous for the sound-absorption purposes of the present invention.

The following Table I gives suitable formulations for panel material useful in the present invention. When water-resistance is desired in the body of the panel, a wax size is used in the furnish in a conventional manner such as the size described in Olson U.S. No. 2,754,206, used in amount of about 1 part of size solids per 100 parts of fiber for the compositions of Table I.

*Table I*

[Parts by Weight]

| Fiber | | | | Additives | | | |
|---|---|---|---|---|---|---|---|
| Mineral wool | Amosite | Glass | Wood | Starch | Bentonite | Diat. earth | Chrysotile asbestos |
| 100 | | | | 13 | | | |
| 90 | 5 | 5 | | 13 | | | |
| 71 | 5 | 24 | | 13 | | | |
| 76 | | 8.5 | | 13 | 15.5 | | |
| 95 | 5 | | | 13 | | | |
| 85 | | | | 13 | 15 | | |
| 90 | 5 | | | 13 | 5 | | |
| 95 | | | | 13 | | | 5 |
| 95 | 5 | | | 5 | | | |
| 95 | 5 | | | 17 | | | |
| | | | 100 | | | | |

One manner of carrying out the invention to produce a single tile is shown in FIGS. 1 through 6. FIG. 1 represents a vegetable or mineral fiber body 10, indicating either a large panel or a cut tile, with rough surface 11 as formed. Numeral 12 represents a sander used to reduce the rough surface to a smooth substantially planar face 13.

FIG. 2 shows a coating roll 15 which may be used to apply a composition 16 for embrittling the surface layer to a slight extent, especially for a vegetable fiber body. A brittle surface layer leads to sharp edges for fissures. The composition is supplied by conduit means 17 forming a pool 18 behind the roll 15. A suitable embrittling composition for cellulose fibers is one containing boric acid, for example, an 8% solution by weight of boric acid in water, with a thickening agent to minimize penetration such as 0.25% of sodium alginate, or an equivalent thickening quantity of a carboxymethyl cellulose of selected viscosity characteristic. FIG. 3 shows the dried composition 16 as forming a hard surface layer 20. It is to be understood that the embrittling composition may be dispensed with.

The hard layer 20 is desired merely to provide a sharp well-defined edge for fissures to be formed, as for example illustrated in FIG. 4. Fissures are then formed in any suitable way. They may be sandblasted through a stencil especially in the case of vegetable fiber tile, or punched in by a die. When the tile has brittle fibers throughout, as when they are predominantly mineral wool or glass fibers, the fissures may be punched in by use of a die which breaks the fibers in its path. The fissures are then blown with a jet of compressed air, making ragged edges and blowing away broken fibers. Then, in addition, it is preferred to apply suction to the fissured areas. The blowing and the suction may be carried out so as to undercut a wall. The fissures are designated 23 in FIG. 4, and according to the method by which the fissures are formed, the walls may or may not be less porous, or more dense, than the untouched interior of the tile, such walls being designated 24.

At the same time, or before or after, that the fissures are formed a bank of suitable tools forms acoustic holes having porous walls. The holes may be drilled so as to remove body material from the tile, or they may be punched. By using suitable small sized punches with specially formed ends, the fibers may be pushed ahead of the tool and compressed after being torn from the side wall of the hole being formed, leaving the walls porous to function as a sound receiver for the porous body. In FIG. 4 illustrating a wood fiber board, such holes are designated by numeral 26, with fiber-fuzzy walls 27, and with a body of compressed fibers 28 torn from the body in forming the walls 27, which fibers may be found at any one of several places in the hole, for example, at a side near the bottom as shown. Numeral 29 represents a different type of punched hole which may be made by a slender tapered pin 29' shown at its full position in hole 29.

The internal pear-shaped cavities in FIG. 4 are such as may be made by punches which tear fibers from the side wall and compress them ahead of the punch. But this occurs only with non-fragile fibers, such as wood fibers, represented in FIG. 4. When the board is made of fragile mineral fibers which crumble ahead of the punch, the cavity has ragged side walls, but is not so enlarged as those shown in FIG. 4, and are of the type shown in FIG. 4$^a$.

FIG. 4$^a$ shows the same general cross-section as that in FIG. 4, with the punched holes 26' more cylindrical, yet ragged, because of the crumbling of its mineral fibers. Another and optional change is also shown for the purpose merely of illustrating an additional variation for visual effect. The original fissures 23' in the cross-section of FIG. 4$^a$ are illustrated as having the same contour as those in FIG. 4, however, with edges 23'' pushed wholly or part way into the cavities 23' forming a smaller crack or fissure 23$^a$ at the left fissure and a plateau 23$^b$ in the right fissure and a new edge 23$^c$. The displaced portions are later made more secure in their new positions by the coating compositions later applied.

FIG. 5 shows positions of spray-gun 30 in full and dotted lines discharging coating composition onto the tile shown in FIG. 4, preferably dark in color for the purpose of coating at least the walls 32 facing the gun. The coat formed is indicated by the stippling 33 to show variable degrees of coating, heaviest on walls 32, lighter on the opposite walls 34, and immaterially light or heavy on the face 35 of the tile.

FIG. 6 shows roll-coating over the face 35 of the tile 10 after the spraying of FIG. 5, thus to provide a uniform contrasting monochrome coat 36 with reference to the coat 33 in the fissures. Any suitable coating roll system may be used, such as roll 38 adjacent smaller roll 39 forming therewith a nip to hold a supply of composition 40, from feed line 41.

Suitable compositions 31 and 40 are preferably aqueous compositions containing pigment and binder such as are well known for coating insulation board, for example, those described in U.S. Patents Nos. 2,409,628, 2,409,629, 2,409,630 and 2,803,188.

In the event that the tiles have beveled edges B (FIG. 7) these may be coated with the same composition 40 in any conventional way illustrated by coating roll 42. Suitable apparatus, therefore, is shown in Heino U.S. Patent No. 2,811,133.

To illustrate the production of variants, as referred to above, the processing is shown diagrammatically. FIG. 8 represents a large sanded panel 50 such as results from the sanding illustrated in FIG. 1. The dotted lines 51 indicate where it will later be cut into tile units. FIG. 9 illustrates an enlarged fragmentary cross-section of the panel 50 to show an optional coating 52 thereon. This coat may be a thin prime coat of a composition such as 40 (FIG. 6), and as such it may serve to fill pores and to form a brittle face in the case of vegetable fiber boards.

FIG. 10 represents a processing line of production in which numeral 53 represents a supply of tile blanks, as cut on lines 51 of FIG. 8, a representative tile blank or unit being referred to by the letter T in the following description.

The heavy-lined blocks each represent one of several operating stations in the production line. Block 54 represents Station A at which fissures are formed by any chosen means and method. The means includes a plurality of different patterns, such as stencils or dies, indicated by a series of small blocks extending from block 55 to block 56. Some of these patterns have fissures alined with the direction of travel, represented by connecting arrows 57, or crosswise thereof. The square T within block 54 represents tile T resting in Station A for fissuring by a selected one 58 of the patterns 55—56. Block 59 within the Station A represents diagrammatically preferred mechanical means, manually or automatically to select and change the pattern as tiles T pass through the station.

Block 60 represents Station B at which holes are formed in the tile T by drilling or punching. The station may have a single pattern of holes, especially when they are of small size and quite invisible at a certain distance from the tile. But there may be a plurality of different patterns, varying in location, hole size, or method, either drilling or punching, as represented by the series of blocks from 61 to 62. Block 60 represents a tile T receiving holes arranged in one pattern 63 selected by suitable means 64 which may manually or automatically select and change the pattern as tiles T pass through the station.

The bracket 65 indicates that the order of operations at Stations A and B may be reversed or the two steps combined.

When the fissures are formed in mineral tile by a punching die, as described above, the fissure-forming dies, and the hole-forming pins, such as pin 29' in FIG. 4, may be combined in a varying series of platens for one punching operation to form both fissures and holes.

There may be an additional station (not shown) in which there are variants of means to alter the edges of one or more fissures formed by one or more of the variants 55—56 in Station A. Such optional station may lie between Stations A and B, or follow immediately after B, or substitute for B where the operations of punching fissures and holes are simultaneous in one station such as A.

Block 70 represents Station C for an optional operation to be used when special fissure-and-face contrast is desired involving a change in color of the fissure walls. Since the fissures may extend along and across the direction of travel of tiles T through Station C, and since opposite walls may be colored differently, there are spray nozzles in the station set for directing spray in the four rectangular directions. For these there may be one supply of color or a series of different colored compositions, indicated by the blocks 71 to 72. Numeral 73 indicates a selected one of the colors 71 to 72, and block 74 indicates manual or automatic means which may be associated with operation of means 59 to bring into play the proper nozzles for the fissure-pattern resting in Station C, so that spraying is limited to the fissured regions. The numerals 75, 76, 77 and 78 each represent a bank of selectable nozzles for each of the four directions. Means 74 may also vary the connections between the selected operating nozzles of each bank and the selected color, where plural selections of the latter are available. It is also to be understood that in Station C nozzles may operate first in one direction and then in the opposite direction as the tile T rests in the station. Spill-over of color onto the face of the tile is corrected in the next station.

Numeral 80 represents Station D wherein the face of tile T receives a final coat, if required, as is so when there is spill-over in Station C. As described, the coat is preferably applied by means limiting it to the face, so as not to coat fissure walls, which may be done by the use of a roller. Although the same monochrome coat for all the tile variants is preferred, it is possible to provide blending colors or shades in the variants of the tile. For this purpose, Station D contains plural sets of coating rolls, each with its particular color, designated by the series 81 to 82. Numeral 83 represents a selected one in operation, and numeral 84 represents manual or automatic means to select and to change the selection.

Numeral 90 represents a Station E at which any bevels on tile T may be coated, a suitable apparatus therefor being shown in the U.S. patent to Heino No. 2,811,133.

Numeral 91 in FIG. 11 represents one of the variant tiles, having one pattern of fissures 92 crosswise of the line of travel 57, holes 93 of which only a few are illustrated, non-porous coated face 94, coated bevels 95, and contrasting coated fissure walls represented by stippling 96.

It is impossible to specify exactly the details of the invention in terms of fissured area and in terms of hole-size and number, such visual contrasts depending not only on those factors but on fissure outline and depth, and color contrast of fissure walls and face. A satisfactory acoustic tile having an acceptable pattern of fissures is exemplified by one having from 1% to 2% of its area in the form of acoustic openings pin-punched therein. The holes may vary in shape, for example, square, round or triangular, with maximum cross-dimension in the range from $\frac{1}{32}$ to $\frac{1}{8}$ inch. These ranges are not limitations, but merely illustrative, to secure good appearance and adequate acoustic value.

From the foregoing description and explanation, it follows that the invention is not limited to or by the illustrative acts and sequence, and that departures therefrom are contemplated as following within the scope of the invention as expressed in the appended claims.

We claim:
1. The method of decorating a porous-bodied acoustical tile which comprises spraying a coating composition of a first color into fissure-like openings in a face of the tile, and then rolling onto said face a coating composition of a color contrasting with said first color.
2. The method according to claim 1 in which said spraying is effected at an acute angle with said face.
3. The method according to claim 1 in which only a portion of the walls of a fissure-like opening is colored by said spraying.
4. The method according to claim 1 in which at least an edge portion of the wall of a fissure-like opening which portion intersects said face is colored by said spraying.
5. The method according to claim 1 in which at least opposite edge portions of the walls of the fissure-like openings which portions intersect said face are colored by said spraying.

References Cited in the file of this patent
UNITED STATES PATENTS

| | | |
|---|---|---|
| 2,338,813 | Hueter | Jan. 11, 1944 |
| 2,388,880 | Stitt | Nov. 13, 1945 |
| 2,459,121 | Willey et al. | Jan. 11, 1949 |
| 2,667,925 | Dalphone | Feb. 2, 1954 |
| 2,668,123 | Copeland | Feb. 2, 1954 |
| 2,791,289 | Proudfoot et al. | May 7, 1957 |
| 2,868,684 | Labino | Jan. 13, 1959 |
| 2,874,796 | Eckert | Feb. 24, 1959 |
| 2,968,327 | Mariner | Jan. 27, 1961 |
| 3,013,626 | Brown et al. | Dec. 19, 1961 |
| 3,017,947 | Eckert | Jan. 23, 1962 |